United States Patent Office 2,815,454
Patented Dec. 3, 1957

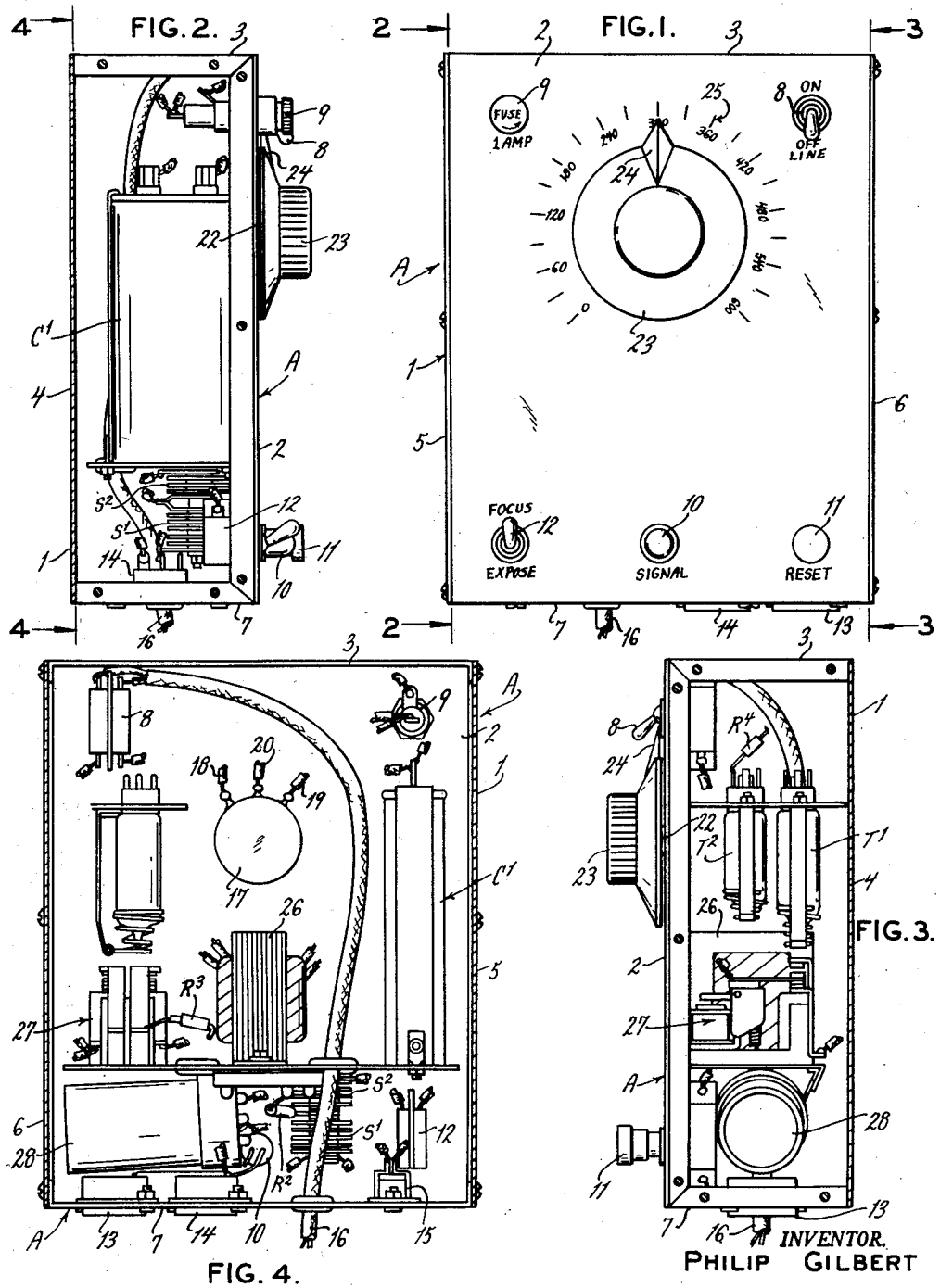

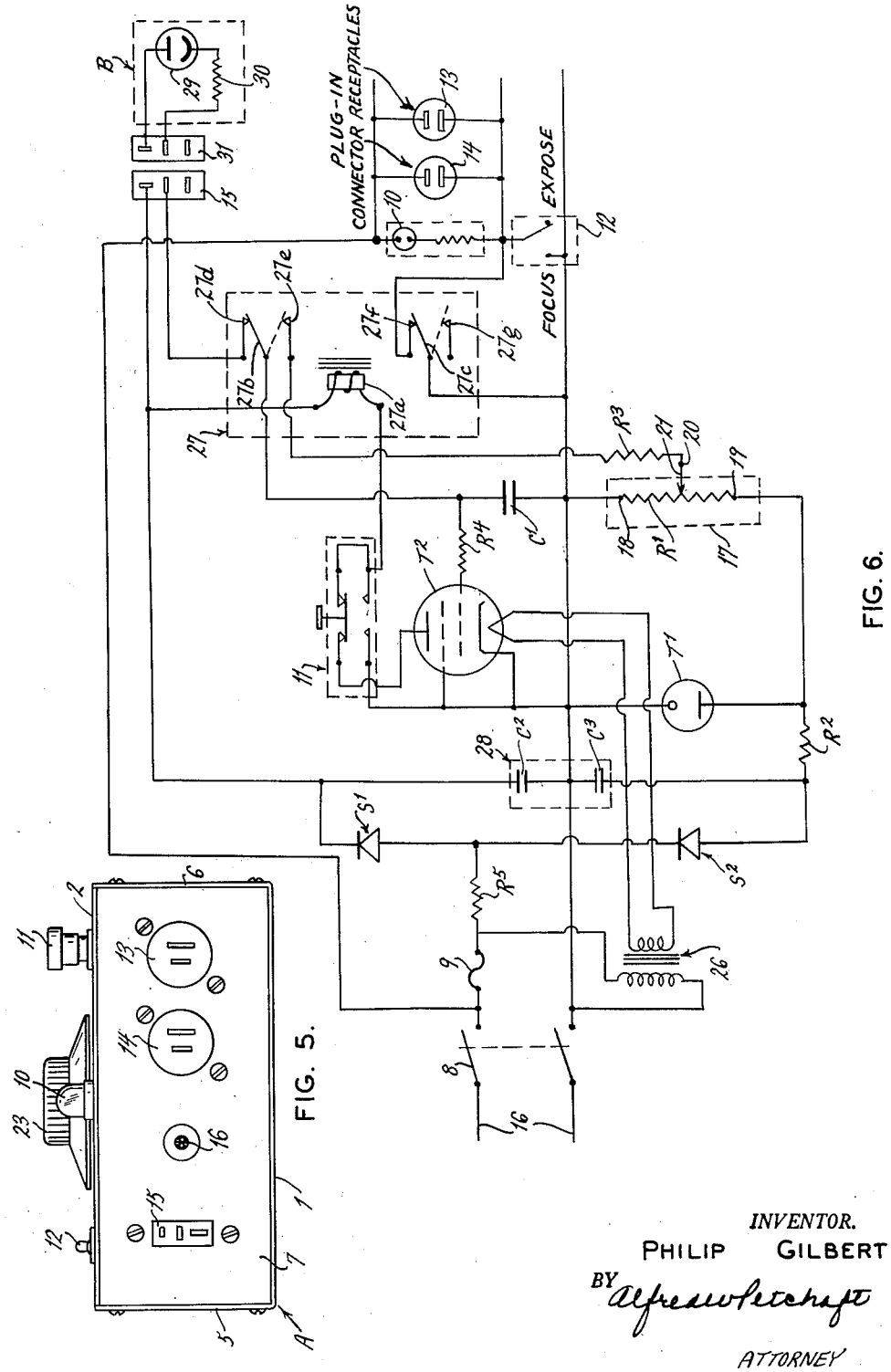

2,815,454
ELECTRONIC COMPUTING DEVICES

Philip Gilbert, Ferguson, Mo., assignor to Universal Match Corporation, St. Louis, Mo., a corporation of Delaware Application July 5, 1952, Serial No. 297,360

4 Claims. (Cl. 250—214)

This invention relates in general to certain new and useful improvements in electronic computing devices and, more particularly, to an electronic integrator capable of measuring a predetermined quantity of a physical phenomenon and to actuate in the device to produce an electrical or mechanical effect when the predetermined quantity is reached.

In many different types of mechanical, chemical and photochemical processes, the end result is a non-linear function of more than one variable and it, therefore, is impossible to establish a control in terms of a single variant. In order to establish a control in such cases, it becomes necessary, therefore, to employ a sensory mechanism in combination with some type of computing or reckoning device which will, in effect, integrate one variable with respect to another variable and provide a sensory response when the integral reaches a predetermined value.

For example, in photographic work, it is highly desirable to measure the volume of light which falls upon the given object. This problem is frequently encountered in making photographic exposures both in printing from already-finished negatives, as well as in exposing the negatives in a camera in the first instance. The problem in photographic work is particularly critical because precise results cannot be photographically reproduced with sufficient accuracy for commercial activities unless it is possible to know that an almost exact and reproducible quantity of light can be employed in making the exposure. Since photographic lights are energized electrically, and electric potential fluctuates from moment to moment, the intensity of the light will vary or fluctuate during any period of exposure. It is, therefore, not possible to obtain precise photographic exposures through the use of a timer, however accurate, inasmuch as relatively small voltage fluctuations result in illumination fluctuations of much greater magnitude, which, in turn, results in negative density variations of comparably great magnitude.

It is, of course, not only necessary to measure the intensity of light during the exposure, but it is also necessary to integrate the intensity of the light in terms of time so that the result may be employed to produce some useful result, such as, for example, tripping a relay which will close the shutter of the camera or in some other way mechanically terminate the exposure at the end of the given period. To be more specific, suppose that in making photographic negatives, it is desirable to expose a plate to a given quantity of light, the operator will, of course, know what amount of exposure is desired having determined this amount either by observation or by previous experiments in which the exposure was too great or too small. It, therefore, becomes necessary for the operator to be able to set an exposure determining device to the amount of exposure desired, so that when the amount of exposure, that is to say, the integral of intensity in terms of time, has been reached, the exposure will be automatically terminated.

It is, therefore, one of the primary objects of the present invention to provide an electronic integrator which is relatively simple in construction and highly reliable in operation and which can be employed to initiate some mechanical result when a predetermined integral or value has been reached.

It is another object of the present invention to provide an electronic integrator of the type stated which can be set to some predetermined integral or value so as to be capable of initiating a mechanical result when such preset value is reached.

With the above and other objects in view, my invention resides in the novel features of form, construction, arrangement, and combination of parts presently described and pointed out in the claims.

In the accompanying drawings—

Figure 1 is a front elevational view of an electronic integrator constructed in accordance with and embodying the present invention;

Figures 2 and 3 are vertical sectional views taken along lines 2—2 and 3—3, respectively, of Figure 1;

Figure 4 is a vertical sectional view taken along line 4—4 of Figure 2;

Figure 5 is a bottom plan view of the electronic integrator; and

Figure 6 is a wiring diagram of the electronic integrator.

Broadly speaking, the present invention resides in the combination of a capacitor, a thyratron tube, means for initially charging the capacitor to a predetermined negative potential, and means for discharging the capacitor, the circuit being so arranged that the capacitor would normally be fully discharged at a point of positive potential in order that the discharging curve of the capacitor is steep as it passes through the point of zero potential. The capacitor discharging means accordingly discharges the capacitor toward this point of positive potential responsive to a sensory element or mechanism, such as a photo-cell and the thyratron tube functions to produce an actuating impulse when the point of zero potential is reached.

Referring now in more detail and by reference characters to the drawings, which illustrate a preferred embodiment of the present invention, A designates an electronic integrator comprising a rectilinear housing 1 having a front panel 2, top wall 3, back wall 4, side walls 5, 6, and bottom wall 7. Mounted in the panel 2 are a double pole single throw main switch 8, a fuse 9, a signal or pilot light 10, a spring-loaded push-switch or "reset-start" switch 11, and a single pole single throw focusing switch 12. Mounted in the bottom wall 7 are three "plug-in" connector sockets 13, 14, 15, and a lead-in cord 16 for conventional connection to a 115 v. A. C. line.

Operatively mounted upon the interior face of the front panel 2 is a potentiometer 17 comprising a resistor $R^1$ having end terminals 18, 19, and an intermediate terminal 20 connected with its sliding contactor 21. The sliding contactor 21 is conventionally mounted on a shaft 22, which extends operatively through the panel 2 and is provided on its external end with a dial 23 having a pointer 24 indexing against a peripheral reference scale 25.

Suitably mounted within the housing 1 is a filament transformer 26, a capacitor $C^1$, a double pole double throw relay 27, a capacitance unit 28, which, in actuality consists of two capacitors $C^2$, $C^3$, two selenium rectifiers $S^1$, $S^2$, resistors $R^2$, $R^3$, $R^4$, $R^5$, a voltage regulator tube $T^1$, and a thyratron tube $T^2$, connected as shown in the wiring diagram, Figure 6. Preferably, though not necessarily, these circuit-forming elements have the following values:

The relay 27 comprises an actuating coil $27^a$ operatively connected to contact blades $27^b$, $27^c$, which are, in turn, adapted to optionally engage contacts $27^d$, $27^e$, $27^f$, $27^g$.

| | | |
|---|---|---|
| $C^1$ | mfd | 2–5 |
| $C^2$ | mfd | 40 |
| $C^3$ | mfd | 40 |
| $S^1$ | ma | 75 |
| $S^2$ | ma | 75 |
| $R^1$ | ohms | 25,000 |
| $R^2$ | do | 1,000 |
| $R^3$ | do | 47,000 |
| $R^4$ | do | 1,000,000 |
| $R^5$ | do | 27 |
| $T^1$ | | (0B2) |
| $T^2$ | | (2D21) |

As shown in full lines in Figure 6, the relay 27 is in unenergized position, in which case the contact blades $27^b$, $27^c$, engage the contacts $27^d$, $27^f$, respectively and the "reset-start" switch 11 is in normal position, that is to say, the position in which it is ordinarily spring-loaded.

Provided for co-operation with the integrator A is a sensory device B which, when the integrator A is being used as a photographic timer, comprises a photo-cell 29, a resistor 30 (1 meg.), and a connector plug 31 for insertion in the connector socket 15. It is, of course, obvious that the sensory device B is placed in front of the camera on the copy board in position to receive illumination directly from the exposure lights. Since the camera, copy board, and exposure lights are conventional and do not form a part of the present invention they are not shown or described.

In use, the dial 23 is turned to some selected reading conforming to the light-quantity to be measured. As shown in Figure 1, the dial is, for example, turned to 300 lumen seconds. The main switch 8 is then closed, thus applying filament and plate voltage to the thyratron tube $T^2$. For a few seconds while the tube $T^2$ is warming up, the blades $27^b$, $27^c$, of the relay 27 will engage the contacts $27^d$, $27^f$, as shown in full lines in Figure 6 and the pilot light 10 will be lit. However, as soon as it is warmed up, the tube $T^2$ will fire, since its control grid is connected through the photo-cell 29 to a point of positive potential. The relay 27 is, thereupon, energized, pulling the blades $27^b$, $27^c$, to the dotted line position so as to engage the contacts $27^e$, $27^g$, respectively, and thereby switching the grid to a selected negative potential on the potentiometer 17 as determined by the setting of the dial 23. The capacitor $C^1$ is thus charged up to this negative potential.

Since the grid has no control over the anode current of the thyratron tube $T^2$ when it is conducting, the circuit tends to remain in this condition. However, when the "reset-start" switch 11 is pressed down momentarily and released, the plate-circuit continuity is broken and the thyratron tube $T^2$ de-ionizes, permitting the grid to take control and the relay 27 drops out, returning the contact blades $27^b$, $27^c$, to full-line position. The capacitor $C^1$ is thereby connected to a point of positive potential in series with the photo-cell 29 and discharges toward ground at a rate dependent upon the illumination on the photo-cell 29. When it reaches a point substantially at zero potential, the grid of the thyratron tube $T^2$ permits conduction and the thyratron tube $T^2$ fires, causing the relay to become energized again and returning its contact blades $27^b$, $27^c$, to the position shown in dotted lines in Figure 6.

It should be noted in this connection that when the integrator A is used for photographic work, an electrical operating mechanism for the camera shutter (not shown) is plugged in to either one of the plugs 13, 14, and is so arranged as to open the shutter when energized or close the shutter when de-energized. If desired, the exposure lights may be plugged into the other one of the plugs 13, 14, and will thus be turned on when the shutter is open or off when the shutter is closed. For focusing purposes, the switch 12 can be set to "focus" position, by-passing the integrator A entirely, thus permitting the shutter to remain open and the exposure lights to remain on. Under these conditions the pilot light 10 will remain lit. When the camera is in readiness, the switch 12 is returned to "exposure" position, cutting off the exposure-lights and closing the shutter. The device is then ready for the desired exposure whenever the "reset-start" switch 11 is pressed down to initiate the sequence of operations above described. As soon as the "reset-start" switch 11 is pressed and the blades $27^b$, $27^c$, of the relay 27 are shifted to the position shown in full lines in Figure 6, current will pass through the relay to the outlet plugs 13, 14, and thence to the shutter operating mechanism and exposure lights to cause an exposure to take place for the number of lumen-seconds predetermined by the setting of the dial 23. While the exposure is going on the pilot light 10 will again be lit.

When the capacitor $C^1$ has reached zero potential and the blades $27^b$, $27^c$, of the relay 27 have been returned to the dotted-line position shown in Figure 6 by the firing of the thyratron tube $T^2$, the flow of current through the connector plugs 13, 14, to the shutter operating mechanism of the camera and to the exposure lights will be instantaneously interrupted. Consequently, the shutter will be closed and the exposure lights turned off, thus terminating the exposure. The pilot light 10 will also go "off," so to speak. The circuit of the integrator A will be returned to the same initial condition as resulted from turning on the main switch 8 and will remain in this condition until the "reset-start" switch 11 is again pressed down. If the operator desires to run another exposure of 300 lumen-seconds, the dial 23 may be left at the same setting as before. If, on the other hand, a different exposure is desired, the operator merely sets the dial 23 to whatever reading is desired, such as, for example, 200 lumen-seconds, and the capacitor $C^1$ will, thereupon, immediately change its potential so as to be charged to the negative potential corresponding to that particular setting on the potentiometer 17. Subsequent operation of the "reset-start" switch 11 will cause the capacitor $C^1$ to discharge to zero potential after an illumination equivalent to 200 lumen-seconds has been imposed upon the photo-cell 29.

It should be noted in connection with the present invention that the capacitor $C^1$ is initially charged to a pre-selected negative potential which may vary from 1 to 105 volts and is then discharged toward zero potential under control of a sensory device, such as the photo-cell 29. As the capacitor $C^1$ reaches zero potential the thyrathron tube $T^2$ fires, actuating a control circuit. Since, during the period of discharging, the capacitor $C^1$ has been negatively charged, the grid of the thyratron tube $T^2$ will draw no current and, hence, there is nothing which operates to affect the rate of change of potential of the capacitor $C^1$. Accordingly, the discharging of the capacitor $C^1$ accurately corresponds to the number of lumen-seconds being measured.

It should also be noted that other sensory devices or transducers may be used for applications other than the measurement of light-quantities so long as the current of the transducer is linearly related to the change of state or energy in the phenomenon being measured. For instance, a resistance which is variable responsive to temperature changes could be used to discharge the capacitor $C^1$ and thus measure the integral of heat units with respect to time.

It should be understood that changes and modifications in the form, construction, arrangement, and combination of the several parts of the electronic computing device may be made and substituted for those herein shown and described without departing from the nature and principle of my invention.

Having thus described my invention, what I claim and desire to secure by Letter Patent is:

1. A predetermined integrator for measuring some selected light phenomenon in relation to time, said integrator comprising a source of potential and voltage dividing means associated therewith to provide a circuit which includes a point of zero potential, a point of positive potential and a point of negative potential, said point of positive potential having a substantially fixed selected value which is substantially positive in relation to the point of zero potential, a capacitor capable of receiving a negative charge, said capacitor being connected on one side to the point of negative potential, means connected to the other side of said capacitor for impressing a negative charge upon the capacitor, a photo cell having a variable resistance linearly proportional to the light phenomenon being measured, said photo cell having its anode connected to said point of positive potential and its cathode connected to the capacitor for discharging the capacitor toward the potential which exists at the point of positive potential so that as the capacitor reaches zero potential, its rate of discharging will be substantially linear at a rate determined by the variations in photo cell resistance resulting from variation in the light phenomenon being measured, and current conductive means having a control element operable to prevent current conduction when at negative potential, said control element being connected to the junction of the capacitor and the photo cell so as to cause current conduction when the capacitor, through discharging, reaches the point of zero potential.

2. A predetermined integrator for measuring some selected light phenomenon in relation to time, said integrator comprising a source of potential and voltage dividing means associated therewith to provide a circuit which includes a point of zero potential, a point of positive potential and a point of negative potential, said point of positive potential having a substantially fixed selected value which is substantially positive in relation to the point of zero potential, a capacitor capable of receiving a negative charge, said capacitor being connected on one side to the point of negative potential, means connected to the other side of said capacitor for impressing a negative charge upon the capacitor, a photo cell having a variable resistance linearly proportional to the light phenomenon being measured, said photo cell having its anode connected to said point of positive potential and its cathode connected to the capacitor for discharging the capacitor toward the potential which exists at the point of positive potential so that as the capacitor reaches zero potential, its rate of discharging will be substantially linear at a rate determined by the variations in photo cell resistance resulting from variation in the light phenomenon being measured, current transmitting means operatively controlled by the capacitor for transmitting an actuating current when the capacitor reaches a point of potential midway between the aforesaid point of positive and negative potential established by the voltage dividing means, and a relay operatively connected to said current transmitting means and being responsive to the actuating current.

3. A predetermined integrator for measuring some selected light phenomenon in relation to time, said integrator comprising a source of potential and voltage dividing means associated therewith to provide a circuit which includes a point of zero potential, a point of positive potential and a point of negative potential, said point of positive potential having a substantially fixed selected value which is subtantially positive in relation to the point of zero potential, a capacitor capable of receiving a negative charge, said capacitor being connected on one side to the point of negative potential, means connected to the other side of said capacitor for impressing a negative charge upon the capacitor, a photo cell having a variable resistance linearly proportional to the light phenomenon being measured, said photo cell having its anode connected to said point of positive potential and its cathode connected to the capacitor for discharging the capacitor toward the potential which exists at the point of positive potential so that as the capacitor reaches zero potential, its rate of discharging will be substantially linear at a rate determined by the variations in photo cell resistance resulting from variation in the light phenomenon being measured, and an electron tube connected to a source of current and having control means connected to the capacitor whereby the tube is biased off as long as the capacitor is negatively charged, said tube being adapted to transmit an actuating current when the capacitor reaches a point of potential midway between the aforesaid point of positive and negative potential established by the voltage dividing means.

4. A predetermined integrator for measuring some selected light phenomenon in relation to time, said integrator comprising a source of potential and voltage dividing means associated therewith to provide a circuit which includes a point of zero potential, a point of positive potential and a point of negative potential, said point of positive potential having a substantially fixed selected value which is substantially positive in relation to the point of zero potential, a capacitor capable of receiving a negative charge, said capacitor being connected on one side to the point of negative potential, means connected to the other side of said capacitor for impressing a negative charge upon the capacitor, a photo cell having a variable resistance linearly proportional to the light phenomenon being measured, said photo cell having its anode connected to said point of positive potential and its cathode connected to the capacitor for discharging the capacitor toward the potential which exists at the point of positive potential so that as the capacitor reaches zero potential, its rate of discharging will be substantially linear at a rate determined by the variations in photo cell resistance resulting from variation in the light phenomenon being measured, an electron tube connected to a source of current and having control means connected to the capacitor whereby the tube is biased off as long as the capacitor is negatively charged, said tube being adapted to transmit an actuating current when the capacitor reaches a point of potential midway between the aforesaid point of positive and negative potential established by the voltage dividing means, and a relay operatively connected to the tube for actuation by the actuating current.

References Cited in the file of this patent

UNITED STATES PATENTS

| | | |
|---|---|---|
| 2,058,011 | Geffcken | Oct. 20, 1936 |
| 2,274,158 | Penther | Feb. 24, 1942 |
| 2,293,425 | Dammond | Aug. 18, 1942 |
| 2,434,101 | Cann | Jan. 6, 1948 |
| 2,463,985 | Linde | Mar. 8, 1949 |
| 2,464,162 | Tuttle | Mar. 8, 1949 |
| 2,469,076 | Rabinowitz | May 3, 1949 |
| 2,484,299 | Labrum | Oct. 11, 1949 |
| 2,561,535 | Paulet | July 24, 1951 |
| 2,579,764 | Schwennesen | Dec. 25, 1951 |
| 2,666,858 | Levine | Jan. 19, 1954 |
| 2,668,474 | Rogers | Feb. 9, 1954 |